United States Patent Office 3,475,388
Patented Oct. 28, 1969

3,475,388
POLYMERIC COMPOSITIONS HAVING PENDANT AZIRIDINYL GROUPS AND IMPROVED METHOD OF CURING SAME
Ronald H. Yocum, Midland, Mich., assignor to The Dow Chemical Company, Midland, Mich., a corporation of Delaware
No Drawing. Filed Dec. 8, 1967, Ser. No. 688,980
Int. Cl. C08f 45/72
U.S. Cl. 260—78.4                                         13 Claims

ABSTRACT OF THE DISCLOSURE

The use of a tertiary amine salt of a polycarboxylic acid as a curing agent for a polymeric resin having a plurality of pendant aziridinyl groups is disclosed. The above composition has an improved shelf life when compared to one using the polycarboxylic acid itself. This improved method of curing provides useful, strongly adherent coatings.

---

This invention relates to an improved process for curing a synthetic polymeric composition containing a plurality of pendant aziridinyl groups per molecule. Additionally the invention relates to a crosslinkable resinous composition having an improved shelf life comprising said polymer and a tertiary amine salt of a dicarboxylic acid as a curing agent and to articles produced therefrom. This invention is particularly useful in preparing protective coatings having excellent adhesion.

Hydroxy alkyl acrylates and methacrylates are frequently used to prepare polymers which can be crosslinked via the hydroxyl groups by various curing agents. However, such cured coatings frequently have inadequate chemical resistance, require higher baking temperatures than desired in many applications and have a relatively short shelf life.

To overcome these disadvantages attention has been given to polymer systems containing as the reactive group a pendant aziridinyl group. A number of di- and polyfunction curing agents may be used to crosslink coating compositions based on such polymers. However, relatively short shelf life persists as a problem with many curing agents, and particularly when the curing agent is a polycarboxylic acid.

Accordingly, this invention provides for a crosslinkable resinous composition having an improved shelf life which comprises a mixture of a synthetic polymer having a plurality of pendant aziridinyl groups per molecule with a tertiary amine salt of a polycarboxylic acid as a curing agent. Further, this invention provides for an improved method of preparing useful protective coatings.

The synthetic polymers include those which contain a plurality of aziridinyl groups per molecule. Advantageously, such polymers can be prepared by polymerizing a monomer mixture comprising from about ¼ to about 50 percent by weight of an aziridinyl alkyl ester of a vinyl carboxylic acid and from about 99¾ to about 50 percent by weight of at least one other copolymerizable vinyl monomer.

Suitable aziridinyl ester monomers include aziridinyl alkyl acrylate or methacrylate monomers having the formula

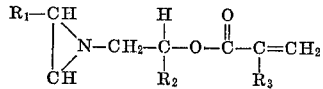

wherein $R_1$ and $R_2$ are hydrogen or a lower alkyl group such as methyl or ethyl and $R_3$ is hydrogen or methyl.

Such monomers include 2-(1-aziridinyl) ethyl acrylate or methacrylate; 2-(2-methyl-1-aziridinyl) ethyl acrylate or methacrylate; 1 - methyl - 2-(2-methyl-1-aziridinyl) ethyl acrylate or methacrylate; 1-methyl-2-(1-aziridinyl) ethyl acrylate or methacrylate; and the like. Suitable also are the aziridinyl alkyl esters of polymerizable α,β-unsaturated dicarboxylic acids such as the maleate esters, fumarate esters, and the like.

Copolymerizability of a monomer is readily determined by well known experimental methods or techniques. Mono-α-methyl styrene, the various halogenated styrenes, the various alkyl substituted styrenes, and the like; (2) α,β-unsaturated carboxylic acid esters of alcohols, said alcohols containing from 1 to about 12 carbon atoms, such as ethyl acrylate and methacrylate, 2-ethylhexyl acrylate and methacrylate and the like, as well as the diesters of maleic acid, fumaric acid and the like; (3) acrylamide and methacrylamide; (4) acrylonitrile; (5) conjugated olefins such as 1,3-butadiene, 2-halo-1,3-butadiene, chloroprene, and the like; (6) N-vinyl pyrrolidone and N-vinyl morpholine; or (7) mixtures of the above.

Copolymerizability of a monomer is readily determined by well known experimental methods or techniques. Monomers having a group which is reactive with the aziridinyl group during polymerization, such as acrylic acid or methacrylic acid, are included among those monomers not copolymerizable with said aziridinyl alkyl acrylates or methacrylates.

The copolymers can be prepared by any of the well-known polymerization methods, but the copolymers are generally prepared at elevated temperatures from about 40 to 150° C., preferably from 60 to 110° C., in the presence of a vinyl polymerization catalyst. The polymerization is preferably carried out in an inert solvent such as aromatic solvents, ketones, dimethyl formamide and the like.

The curing or crosslinking of copolymers containing pendant aziridine rings is known to occur with di- and polyfunctional reagents which contain reactive hydrogens as well as with aziridine ring polymerization catalysts. Typical crosslinking reagents include dimercaptans, polycarboxylic acids and the like. Crosslinking similar to the above is described in a copending application by Ashby, Ser. No. 682,590 filed Nov. 13, 1967 which is a continuation-in-part of a prior application, Ser. No. 492,853 filed on Oct. 4, 1965, now abandoned.

Polycarboxylic acids readily cure copolymers containing pendant aziridinyl groups; however the shelf life of the formulation is generally limited to less than 24 hours. By utilizing the tertiary amine salt of polycarboxylic acids according to the process of this invention the shelf life is improved by as much as five fold. The shelf life is further improved if an excess of amine is utilized in preparing a coating formulation, for example.

Preferred polycarboxylic acids include the dicarboxylic acids although compounds containing 3 or more carboxylic acid groups per molecule are useful. Suitable dicarboxylic acids include the aliphatic acids such as oxalic acid, malonic acid, succinic acid, pimelic acid, azelaic acid, adipic acid, sebacic acid and the like; unsaturated aliphatic acids such as maleic acid, the halogenated maleic acids, fumaric acid, itaconic acid and the like; diglycolic acid, dilactic acid, dithoglycolic acid and the like; 1,2-cyclohexanedicarboxylic acid, 1,4-cyclohexanedicarboxylic acid and the like; aromatic acids such as phthalic acid, isophthalic acid, terephthalic acid, tetrachlorophthlic acid, tetrahydrophthalic acid, 1,8-naphthalene dicarboxylic acid, and the like; and mixtures thereof.

Suitable tertiary amines include trialkyl amines such as triethyl amine, tributyl amine, triisopropyl amine and the like and trialkyl amines having alkyl groups of differing chain length; aralkyl amines such as N,N-diethyl aniline and the like; heterocyclic amines such as N-alkyl morpholine, N-alkyl piperidine, N-alkyl pyrrolidine and the like; N,N-dialkyl cyclohexyl amines; aromatic amines such as pyridine; and mixtures thereof, wherein said alkyl group is a lower alkyl group of one to about six carbon atoms. Preferably the amines are sufficiently volatile so as to be substantially evaporated from a coating formulation film in about one-half hour at about 350° F.

The tertiary amine salt can be prepared in several different ways but preferably the polycarboxylic acid is added to a suitable inert solvent and mixed with a tertiary amine until a solution is obtained. The amine salt, of course, can be prepared directly in the polymer solution. The tertiary amine is combined with the polycarboxylic acid in the proportion of about 1 equivalent of amine per 1 equivalent of acid, however the amount of the amine may vary from about 0.5 to about 5 equivalents per each equivalent of acid. Advantageously, an excess of amine provides further improvement in shelf-life over the 1:1 amine/acid salt. While even larger amounts of amine may be used little further improvement in shelf-life stability is obtained.

The curable copolymer composition is prepared by admixing the copolymer with a tertiary amine salt of the polycarboxylic acid dissolved in an inert organic solvent or with an excess of the amine. Generally it is most convenient to prepare separate solutions of the two major components and then admix the solutions. The polycarboxylic acid may be used in amounts of about 0.5 to about 1 equivalent per each aziridinyl equivalent and preferably is used on a 1:1 equivalent basis.

The solids concentration may vary widely from as little as 1 percent by weight to as much as 50 percent by weight or more, depending upon the end use. The solvent or solvent mixture is not critical in that many volatile, inert organic solvents may be used. Since a principal area of use for the composition of this invention is for decorative and protective coatings, the choice of solvents will depend on the means of applying hte coating, costs, drying time, viscosity, etc. Generally, the copolymer compositions are cured by the application of heat. A preferred range of curing temperatures is about 150° F. to about 400° F. The time will vary depending on both the formulation and the temperature of curing.

Additionally the copolymer compositions may contain other additives such as pigments, colorants, fillers, plasticizers, anti-oxidants, etc. so long as the additives do not interfer with the crosslinking reaction.

The invention is illustrated but not limited by the following examples.

EXAMPLE 1

Shelf life stability

A terpolymer was prepared by a solution polymerization procedure from the following monmers:

| | Gms. |
|---|---|
| Styrene | 96 |
| Butyl acrylate | 72 |
| 2-(1-aziridinyl) ethyl methacrylate | 30 |
| Di-t-butyl peroxide (catalyst) | 2 |

The above monomer solution was purged with nitrogen for thirty minutes and then added dropwise to a 1000 ml. round bottom, three-necked flask equipped with a reflux-condenser, a mechanical stirrer and a 500 ml. additional funnel. The reaction flask contained 200 gms. of xylene and 2 gms. of di-t-butyl peroxide at 120° C. The monomer solution was added over a two hour period and the total polymerizatoin time was about 8 hours.

The above terpolymer was then admixed with various dicarboxylic acids and tertiary amine salts essentially at an equivalent ratio of carboxylic acid to aziridinyl group and the shelf life of the formulations determined at room temperature.

| Curing Agent | Shelf life, hours |
|---|---|
| Adipic acid | 21 |
| Adipic acid/tributylamine salt [1] | 75 |
| Adipic acid/triethylamine salt [1] | 110 |
| Isophthalic acid/triethylamine salt [1] | 70 |

[1] Essentially a 1:1 equivalents ratio of amine/carboxylic acid.

EXAMPLE 2

Thermosetting coating formulation

Using the terpolymer of Example 1 a coating formulation comprised of the following was prepared:

| | Parts by weight |
|---|---|
| Polymer (49.6% solids) | 50.5 |
| Adipic acid | 1.8 |
| Triethyl amine | 2.4 |
| n-Butanol | 6.6 |
| 2-ethoxyethyl acetate | 15.9 |

The coating formulation was applied to polished, unprimed "Q" panels and a 1 mil coating had the following properties:

| | |
|---|---|
| Cure temperature ° F | 300 |
| Cure time min | 30 |
| Knoop hardness | 15.2 |
| ⅛" conical bend | Passes |
| Impact—Front in.-lbs | 160 |
| Reverse in.-lbs | 144 |
| MEK [1] solvent resistance | Good |

[1] MEK—Methyl ethyle ketone.

EXAMPLE 3

Pigmented coating

Using the terpolymer of Example 1 a pigmented formulation comprised of the following was prepared:

| | Parts by weight |
|---|---|
| Pigmented polymer (66.3% solids) [1] | 37.8 |
| Adipic acid | 0.9 |
| Triethyl amine | 1.2 |
| n-Butanol | 20.5 |
| 2-ethoxyethyl acetate | 13.6 |

[1] Pigmented by addition of TiO₂ in a 1:1 wt. ratio based on resin solids.

As in Example 2 coatings were prepared on "Q" panels and a 1 mil coating had the following properties:

| | |
|---|---|
| Cure temperature F | 300 |
| Cure time min | 30 |
| Knoop hardness | 20.7 |
| Impact—Front in.-lbs | 100 |
| Reverse in.-lbs | 88 |
| MEK solvent resistance | Very good |

EXAMPLE 4

Effect of cure temperature

A coating formulation comprised of the following was prepared using the terpolymer of Example 1.

| | Parts by weight |
|---|---|
| Polymer (46.3% solids) | 21.6 |
| Adipic acid | 0.7 |
| Triethyl amine | 1.0 |
| N,N-dimethyl formamide | 4.2 |
| 2-ethoxyethyl acetate | 4.1 |

Films were cast as in previous examples and cured at different temperatures with the following properties.

| | Film Cured at— | | | |
|---|---|---|---|---|
| | 150° F. | 200° F. | 250° F. | 300° F. |
| Knoop hardness | 14.5 | 15.9 | 16.5 | 17.4 |
| MEK solvent resistance | Poor | Fair | Good | Good |
| Cure time, minutes | 30 | 30 | 30 | 30 |

EXAMPLE 5

Coating prepared with azelaic acid

A polymer was prepared from 49 parts of methyl methacrylate, 36 parts of butyl acrylate and 15 parts of 2-(1-aziridinyl) ethyl methacrylate in a manner similar to Example 1. The polymer was prepared as a 51.7 percent solids solution in a benzene/ethylacetate solvent.

A paint base was prepared by ball milling for 72 hours 336 gms. of polymer solution with 168 gms. of $TiO_2$ and 200 gms. of 2-ethoxyethyl acetate. Coatings were prepared from the paint base by combining 166 gms. of the paint base formulation with 3.7 gms. of azelaic acid, 2.8 gms. of triethylamine and 35.3 gms. of xylene and applying the coating to bonderite panels. The coating was cured at 250° F. for 30 minutes and was about 1.8 mils in thickness. The cured coating had excellent MEK solvent resistance, passed a ⅛ inch conical bend test, had a Knoop hardness of 18.2 and a front impact resistance of 32 inch-lbs. and a reverse impact of 8 inch-lbs.

EXAMPLE 6

Shelf-life stability with an excess of amine

A polymer was prepared in a manner similar to the previous examples which comprised 50 percent methyl methacrylate, 35 percent 2-ethylhexyl acrylate and 15 percent 2-(1-aziridinyl) ethyl methacrylate as a 51.2 percent solids solution in a benzene/ethyl acetate (50/50) solvent.

A formulation was prepared comprising 70.7 gms. of the polymer solution, 2.4 gms. of adipic acid, 13.4 gms. of triethyl amine and 10 gms. of methyl isobutyl ketone. With about 4 equivalents of triethyl amine per each equivalent of carboxylic acid the solution had not changed in viscosity over a 10 day test period which is about double the shelf life of a 1/1 acid/amine formulation.

One property common to all the coatings was the excellent adhesion of the coating to the substrate, particularly when the triethylamine salt of adipic acid was used as the curing agent. The coatings of this invention may be applied by spraying, dipping, brushing, etc. and the decorative or protective coatings may be applied to a variety of substrates such as wood, steel, paper and the like.

What is claimed is:

1. A process for curing a resinous copolymer having a plurality of aziridinyl groups per molecule which comprises mixing a tertiary amine salt of a polycarboxylic acid with said copolymer and heating to cure said mixture; said mixture prepared to contain at least about 0.5 equivalent of tertiary amine per each equivalent of carboxiylic acid and from about 0.5 to about 1 equivalent of carboxylic acid per each aziridinyl equivalent.

2. The process of claim 1 wherein said polycarboxylic acid is adipic acid or azelaic acid.

3. The process of claim 1 wherein said tertiary amine is triethylamine or tributylamine.

4. The process of claim 1 wherein said copolymer is the polymerization product of a monomer mixture comprised of about 1 to about 50 percent by weight of an aziridinyl alkyl ester of a vinyl carboxylic acid and the balance to make 100 percent of at least one other copolymerizable vinyl monomer.

5. The process of claim 4 wherein the aziridinyl alkyl ester has the formula $$\begin{array}{c} R_1-CH \\ \phantom{R_1-C}\diagdown \\ \phantom{R_1-CH}N-CH_2-\underset{\underset{R_2}{|}}{C}-O-\overset{\overset{O}{\|}}{C}-\underset{\underset{R_3}{|}}{C}=CH_2 \\ \phantom{R_1-C}\diagup \\ CH_2 \end{array}$$

wherein $R_1$ and $R_2$ individually are hydrogen or a lower alkyl group and $R_3$ is hydrogen or methyl.

6. The process of claim 5 wherein the aziridinyl ester is 2-(1-aziridinyl) ethyl methacrylate.

7. A curable composition which comprises an inert organic solvent solution of a tertiary amine salt of a polycarboxylic acid and a copolymer having a plurality of aziridinyl groups per molecule; said solution prepared to contain at least about 0.5 equivalent of a tertiary amine per each equivalent of carboxylic acid and from about 0.5 to about 1 equivalent of carboxylic acid per each aziridinyl equivalent.

8. The composition of claim 7 wherein said polycarboxylic acid is adipic acid or azelaic acid.

9. The composition of claim 7 wherein said tertiary amine is triethylamine or tributyl amine.

10. The composition of claim 7 wherein said copolymer is the polymerization product of a monomer mixture comprised of about 1 to about 50 percent by weight of an aziridinyl alkyl ester of a vinyl carboxylic acid and the balance to make 100 percent of at least one other copolymerizable vinyl monomer.

11. The composition of claim 7 wherein the aziridinyl alkyl ester has the formula $$\begin{array}{c} R_1-CH \\ \phantom{R_1-C}\diagdown \\ \phantom{R_1-CH}N-CH_2-\underset{\underset{R_2}{|}}{C}-O-\overset{\overset{O}{\|}}{C}-\underset{\underset{R_3}{|}}{C}=CH_2 \\ \phantom{R_1-C}\diagup \\ CH_2 \end{array}$$

wherein $R_1$ and $R_2$ individually are hydrogen or a lower alkyl group and $R_3$ is hydrogen or methyl.

12. The composition of claim 11 wherein the aziridinyl ester is 2-(1-aziridinyl) ethyl methacrylate.

13. An article comprising a substrate coated with the heat cured composition of claim 7.

References Cited

UNITED STATES PATENTS

| | | | |
|---|---|---|---|
| 3,251,812 | 5/1966 | Hsieh | 260—78.4 XR |
| 3,262,991 | 7/1966 | McClendon et al. | 260—873 |

JOSEPH L. SCHOFER, Primary Examiner

J. KIGHT, Assistant Examiner

U.S. Cl. X.R.

260—78.5, 2, 873

PO-1050
(5/69)

UNITED STATES PATENT OFFICE
CERTIFICATE OF CORRECTION

Patent No. 3,475,388            Dated October 28, 1969

Inventor(s) Ronald H. Yocum

It is certified that error appears in the above-identified patent and that said Letters Patent are hereby corrected as shown below:

The formula in Column 1 starting at line 65 should read as follows:

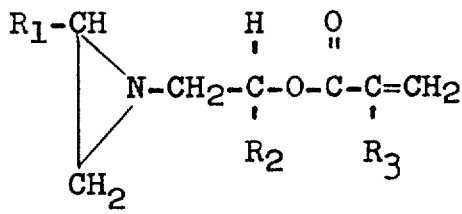

In Column 2, lines 9 and 10, delete "Copolymerizability of a monomer is readily determined by well known experimental methods or techniques. Mono-" and insert --Copolymerizable vinyl monomers include 1) monovinyl aromatic monomers such as styrene, vinyl toluene,--.

SIGNED AND
SEALED
JUN 2 1970

(SEAL)
Attest:

Edward M. Fletcher, Jr.
Attesting Officer

WILLIAM E. SCHUYLER, JR.
Commissioner of Patents